(12) United States Patent
Dally

(10) Patent No.: US 11,946,587 B2
(45) Date of Patent: Apr. 2, 2024

(54) SIMPLE BEARING FOR SOLAR TRACKING

(71) Applicant: SUN AND STEEL SOLAR LLC, Stateline, NV (US)

(72) Inventor: Robert B. Dally, Stateline, NV (US)

(73) Assignee: SUN AND STEEL SOLAR LLC, Stateline, NV (US)

( * ) Notice: Subject to any disclaimer, the term of this patent is extended or adjusted under 35 U.S.C. 154(b) by 0 days.

(21) Appl. No.: 17/684,213

(22) Filed: Mar. 1, 2022

(65) Prior Publication Data
US 2023/0279987 A1    Sep. 7, 2023

(51) Int. Cl.
| | |
|---|---|
| *F16M 11/10* | (2006.01) |
| *F16C 13/04* | (2006.01) |
| *F16M 11/18* | (2006.01) |
| *H02S 20/32* | (2014.01) |
| *H02S 30/10* | (2014.01) |

(52) U.S. Cl.
CPC ............. *F16M 11/10* (2013.01); *F16C 13/04* (2013.01); *F16M 11/18* (2013.01); *H02S 20/32* (2014.12); *H02S 30/10* (2014.12)

(58) Field of Classification Search
CPC ........ F16M 11/10; F16M 11/18; H02S 20/32; H02S 30/10; F16C 13/04
See application file for complete search history.

(56) References Cited

U.S. PATENT DOCUMENTS

| | | | | |
|---|---|---|---|---|
| 3,820,860 | A * | 6/1974 | Stone | F16C 33/046 |
| | | | | 198/672 |
| 4,704,038 | A * | 11/1987 | Bruchon, Jr. | F16C 33/08 |
| | | | | 384/443 |
| RE32,764 | E * | 10/1988 | Smith | F16C 17/10 |
| | | | | 384/275 |
| 7,354,199 | B2 * | 4/2008 | Welch | F16C 9/00 |
| | | | | 384/275 |
| 9,035,168 | B2 | 5/2015 | Barton | |
| 9,206,999 | B2 * | 12/2015 | Reed | F24S 25/70 |
| 9,273,721 | B2 * | 3/2016 | Behn | F16C 19/26 |
| 9,322,437 | B2 * | 4/2016 | Agullo | F16C 23/04 |
| 9,531,320 | B2 * | 12/2016 | Gonzalez Moreno | H02S 40/22 |
| 9,806,669 | B2 * | 10/2017 | Michotte De Welle | |
| | | | | F16M 11/10 |
| 10,298,172 | B2 * | 5/2019 | Oh | F24S 25/632 |
| 10,320,326 | B2 | 6/2019 | Schimelpfenig et al. | |
| 10,584,902 | B2 | 3/2020 | Ros Ruiz et al. | |
| 10,944,354 | B2 * | 3/2021 | Ballentine | H02S 30/10 |
| 10,972,045 | B2 * | 4/2021 | Cherukupalli | F24S 50/20 |
| 11,035,591 | B2 * | 6/2021 | Childress | F16C 17/10 |
| 11,230,866 | B2 * | 1/2022 | Dally | E05D 5/06 |

(Continued)

FOREIGN PATENT DOCUMENTS

WO     WO-2020129091 A1 *  6/2020     ............ F16C 23/045

OTHER PUBLICATIONS

U.S. Restriction Requirement for U.S. Appl. No. 17/558,208 dated Dec. 28, 2022.

(Continued)

*Primary Examiner* — Eret C McNichols
(74) *Attorney, Agent, or Firm* — Sherman IP LLP; Kenneth L. Sherman; Steven Laut

(57) ABSTRACT

A bearing for single-axis solar tracking system includes a journal with a tube portion connected to a pair of flanges that are configured as a thrust-stop. The bearing further includes a race removably connected to the journal.

20 Claims, 21 Drawing Sheets

(56) References Cited

U.S. PATENT DOCUMENTS

| | | | |
|---|---|---|---|
| 11,300,979 B2* | 4/2022 | Kesler | F24S 30/425 |
| 11,387,771 B2* | 7/2022 | Au | F16H 19/04 |
| 11,411,529 B2* | 8/2022 | Liu | H02J 7/35 |
| 2011/0253195 A1* | 10/2011 | Kim | H02S 20/32 |
| | | | 136/246 |
| 2012/0216851 A1* | 8/2012 | Jang | H01L 31/04 |
| | | | 136/246 |
| 2013/0160816 A1* | 6/2013 | Barton | H02S 20/10 |
| | | | 136/246 |
| 2016/0218663 A1* | 7/2016 | Werner | F24S 30/425 |
| 2017/0234580 A1* | 8/2017 | Worden | F24S 30/42 |
| | | | 126/606 |
| 2018/0062565 A1* | 3/2018 | Schimelpfenig | H02S 20/32 |
| 2018/0062567 A1* | 3/2018 | Oh | H02S 20/32 |
| 2018/0347859 A1* | 12/2018 | Ros Ruiz | F16B 7/0486 |
| 2019/0226520 A1* | 7/2019 | Forder | F16C 17/10 |
| 2020/0052643 A1* | 2/2020 | Ballentine | F16M 11/10 |
| 2020/0076357 A1* | 3/2020 | Cherukupalli | F24S 30/425 |
| 2021/0305932 A1* | 9/2021 | Liu | H02S 20/32 |
| 2022/0052636 A1* | 2/2022 | Au | H02S 20/32 |
| 2022/0077816 A1* | 3/2022 | Morin | H02S 20/32 |
| 2022/0103116 A1 | 3/2022 | McPheeters | |
| 2022/0149773 A1* | 5/2022 | Reznar | F16C 23/046 |
| 2022/0200520 A1* | 6/2022 | Dally | H02S 20/32 |
| 2022/0278642 A1* | 9/2022 | Kumar | H02S 20/32 |
| 2022/0294385 A1* | 9/2022 | Guo | F24S 25/12 |
| 2022/0294386 A1* | 9/2022 | Creasy | H02S 20/32 |
| 2022/0325736 A1* | 10/2022 | De La Fuente De Pablo | F16B 7/182 |
| 2022/0333642 A1* | 10/2022 | Sasidharan | F24S 30/425 |

OTHER PUBLICATIONS

U.S. Office Action U.S. Appl. No. 17/558,208 dated Feb. 14, 2023.
U.S. Notice of Allowance for U.S. Appl. No. 17/558,208 dated Aug. 15, 2023.
U.S. Corrected Notice of Allowability for U.S. Appl. No. 17/558,208 dated Sep. 1, 2023.
U.S. Advisory Action for U.S. Appl. No. 17/558,208 dated Jun. 29, 2023.
U.S. Final Office Action U.S. Appl. No. 17/558,208 dated Apr. 20, 2023.

* cited by examiner

SIMPLE BEARING FOR SOLAR TRACKING

TECHNICAL FIELD

One or more embodiments relate generally to the journaling for the rotation of solar panels, and in particular, by simplifying the journal of the bearing so that it performs multiple necessary functions in the controlled turning of the solar panels.

BACKGROUND

Single axis trackers are mounting structures used for the controlled movement of photovoltaic (PV) solar panels and other solar collecting means from east to west to track the sun daily. Bearings are used to properly rotate the solar panels to track the sun. These bearings can have ball bearings, roller bearings or dry bushings, or a simple bearing of a rotating journal turning and rubbing inside a bearing race.

SUMMARY

Some embodiments provide a bearing for single-axis solar tracking system includes a journal with a tube portion connected to a pair of flanges that are configured as a thrust-stop. The bearing further includes a race removably connected to the journal.

One or more embodiments provide a single-axis solar tracking system that includes a first torque tube connected to a first solar panel. A second torque tube connected to a second solar panel. A journal includes a tube portion having a pair of flanges that are configured as a thrust-stop. The first torque tube is connected to a first side of the tube portion, and the second torque tube is connected to a second side of the tube portion. A race is removably connected to the journal.

Some embodiments provide a bearing for single-axis solar tracking system that includes a journal having a tube portion connected to a pair of flanges that are configured as a thrust-stop. A race includes a lower portion removably connected to the tube portion, and an upper portion removably connected to the tube portion and the lower portion.

DETAILED DESCRIPTION

Figure 1:
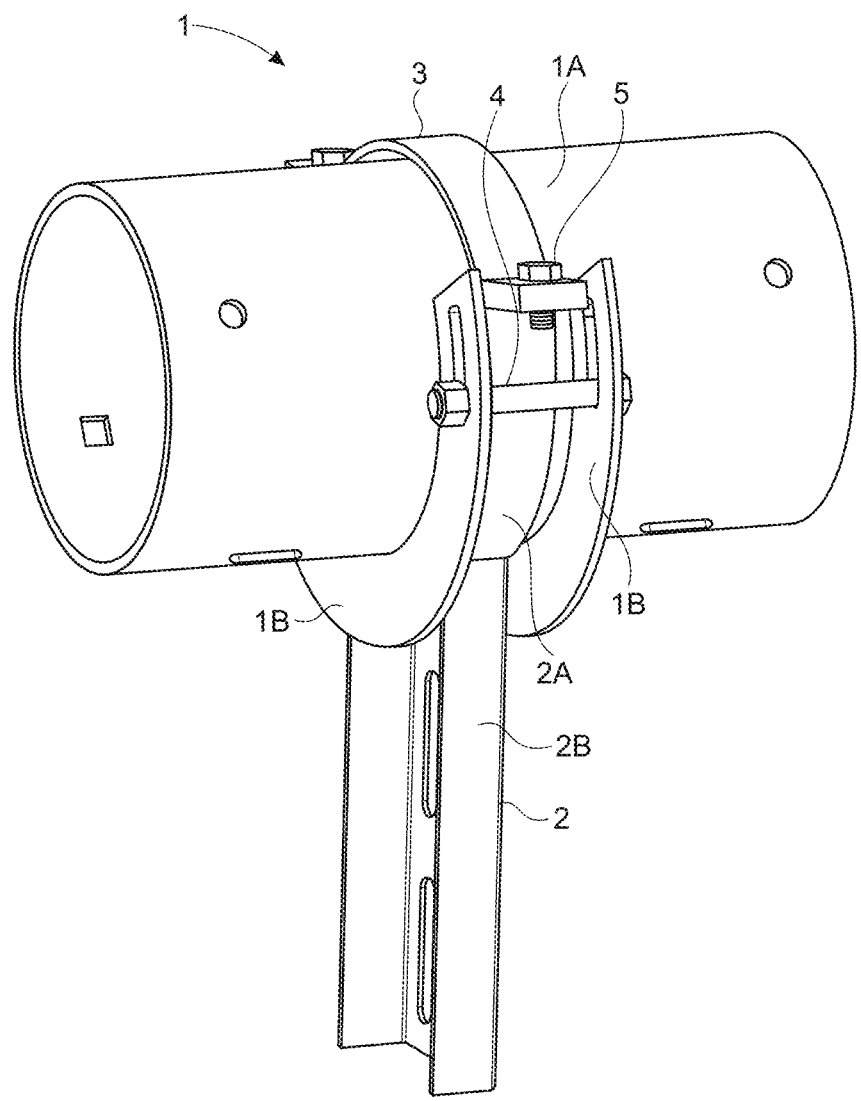
FIG. 1 shows a perspective view of a simple bearing, according to one or more embodiments.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments relate generally to a bearing system for journaling or rotating solar panels on a single-axis tracking system. Some embodiments add bushings to decrease the friction between the bearing race and the turning journal or turning torque tube. One or more embodiments use the bushing to also provide a transfer of shape, such as from a multi-faceted torque tube (e.g. a square tube, an octagon tube, etc.) to a round bearing race. Some embodiments provide ball bearings or roller bearings to allow rotation of the torque tube, which has the minimal amount of friction that is unnecessary. The embodiments interrupt the ground path from a grounded torque tube to the support posts via plastic (insulated) bushings, greased ball or roller bearings, which require the addition of a moving ground cable at each and every post (this ensures the posts are grounded to the true earth ground).

Some embodiments use a simple round (circular) journal made of steel as both the journal inside a simple bearing and the coupler to join torque tube sections end to end. The round journal turns inside a round (circular) bearing race. This ample amount of contact area reduces the pressure between the journal and the bearing race so that there is virtually no wear of either surface in this application of turning only once a day, from a tilt east to a tilt west, and back. The pressure delivers the necessary friction for damping in the wind. Whereas conventional systems add damping devices external to their slippery bearings, distinguishable, one or more embodiments already have the damping and need no external damping devices. The embodiments provide that the ground path is maintained via the ample rubbing surfaces, which are in constant contact, even when they move via the slow turning of the journal inside the bearing race. The bearings effectively ground each post thereby bypassing the need for flexible ground wires between each and every stationary post and the journaling and grounded torque tube.

One or more embodiments has two (thrust-stop) flange portions on either side of the bearing race to prevent movement of the torque tube and solar panels along the axis of rotation, either from a north-south slope of the system or from a seismic event. The flange portions rub against the outside edges of the bottom bearing race. Some embodiments have holes (e.g., openings/through-holes) and (curved) slots (e.g., curved through-openings) in each flange portion, to affix bolts (or other fasteners) that will span from one flange portion to the other. These bolts may be placed in a set of holes or openings that prevent the torque tube from tilting while the drive system is not yet attached or operational. The bolts are then placed inside the slots to perform as mechanical tilt-stops when the tracker is tilted at ±50 degrees, for example. This allows all wind torque to be transferred to all the posts in a row when the solar panels are fully tilted and the wind comes from behind, placing maximum force on the solar panels and hence maximum torque on the torque tube. The tilt-stop bolts, due to their weight, rest in the lower portion of the two slots unless they are moved along the slots during higher tilts of the photovoltaic (PV) solar panels. While sitting at the low end of the slots, the two bolts are positioned underneath the bottom bearing race, holding the journal-coupler and the torque tubes to the posts without the need of a top cap on the bearing race (top bearing race). Upon the torque tube being lifted by the wind when the panels are flat, the bolts pinch the bottom bearing race tighter, creating increased friction and increased frictional holding. When the solar panels are tilted, and the torque tube and journal-coupler rotate, one of the tilt-stop bolts will eventually become pinched between the neck of the bottom bearing race post and the upper end of the curved slot, providing transferring torque in that direction to the posts.

Some embodiments are directed to a simple bearing system of a round (circular) journal-coupler turning in a round (circular) race, the journal having thrust-stops that prevent movement along the axis of rotation (generally north-south), the two thrust-stops having through-holes and curved through-slots for the insertion and/or affixing of bolts or pins (or other fasteners) to bridge from the south-side flange portion to the north-side flange portion and thereby establish tilt-stops (either temporary for holding the tracker at no tilt for either construction or maintenance if and when the drive system is not connected, or permanent and moveable in the curved slots to perform as physical stops at the east and west tilt limits). Therefore, some embodiments dump, or transfer, all worst-case, rear-side approaching wind-induced torque, rather than depend on the central drive to handle that worst-case torque, again, should the solar panels be stowed at either of the two (east and west) tilt limits.

It should be noted that most conventional single-axis trackers utilize a plastic bushing in their bearings, partly in fear that a steel-on-steel simple bearing will wear out over a 30-year life span, which equates to about 22,000 partial turns/rotations (e.g., ±45° once a day, 365 days/year for 30 years). This turning/rotating is a very slow process, and very infrequent, typically at a speed of about one degree in eight seconds. Only tracking or turning/rotating for about eight seconds to turn/rotate one degree, and then stopping for about four minutes as this is about the average time it takes for the sun to move one degree in the sky. Thereafter, the bearing turns another one degree in about eight seconds before shutting off and waiting for another turn/rotation (approximate four minutes); and then repeat. The conventional plastic bushing often is not used simply as a wear surface, but also as a structural element to transfer from a non-round torque tube (e.g. square, octagon) to a round race. The plastic bushing, when used as a structural component, gets worked by the shifting weight of the top-heavy array of solar panels and can crack or break. The plastic bushing vastly reduces the friction, making it easy for a small in-line slew drive to turn the torque tube, but also making it easy for the wind to gallop the wing of the PV solar panel system, and thus the common fix is to add shock absorbers at each bearing to dampen the gallop. The plastic bushing also interrupts the electrical ground pathway from the torque tube to the post, thus necessitating the add-on fix of a flexible ground strap at each and every post, connecting each post to the grounded torque tube. Other conventional single-axis trackers use regular ball bearings or roller bearings in the 30-year outdoor environment. These conventional bearings also do not offer frictional damping, nor do they maintain electrical ground continuity from the inner journal to the outer race.

Some embodiments provide a bearing for single-axis solar tracking system includes a journal with a tube portion connected to a pair of flanges that are configured as a thrust-stop. The bearing further includes a race removably connected to the journal.

One or more embodiments provide a single-axis solar tracking system that includes a first torque tube connected to a first solar panel. A second torque tube is connected to a second solar panel. A journal includes a tube portion having a pair of flanges that are configured as a thrust-stop. The first torque tube is connected to a first side of the tube portion, and the second torque tube is connected to a second side of the tube portion. A race is removably connected to the journal.

Some embodiments provide a bearing for single-axis solar tracking system that includes a journal having a tube portion connected to a pair of flanges that are configured as a thrust-stop. A race includes a lower portion removably connected to the tube portion, and an upper portion removably connected to the tube portion and the lower portion.

FIG. 1 shows a perspective view of a simple bearing, according to one or more embodiments. In some embodiments the simple bearing includes a round (circular) bottom bearing race 2 including a round (circular) bottom bearing race portion 2A connected to a post (or neck) portion 2B, a journal 1 which consists of a tube (round, circular, cylindrical, etc.) portion 1A and two flange portions 1B which perform as thrust-stops when they bump, press, rub, etc. during rotation against one side (outside edge) or the other of the bottom bearing race portion 2A, and that have matching curved thru-slots 1C (FIG. 2) and holes (through-holes, openings, etc.) 1D (FIG. 2) to insert and/or affix fasteners 4 (e.g., bolts, pins, etc.) to perform as tilt-stops and/or tilt-holds. The flange portions 1B maintain the position of the journal 1 within the bottom bearing race 2 and provide a prevention of the torque tube 1A from slipping or moving north-south along the axis of rotation due to a north-south slope in the system, a seismic event with north-south abrupt movement, or a north or south wind component.

In some embodiments, the journal 1 also functions as a coupler to join two sections of torque tube, for which this journal 1 component will also be referred to as a journal-coupler 1. A top cap (or top bearing race) 3, is attached to the connecting tabs of the bottom bearing race portion 2A with standard fasteners 5 (e.g., bolt/nut hardware), properly positioning and retaining the journal-coupler 1 to the bearing race that includes the bottom bearing race 2 and the top cap 3. The top cap 3 holds the journal-coupler 1 from lifting out of the bottom bearing race portion 2A upon wind lift of the solar panels (one or more solar panels, or one or more sets of solar panels), torque tube and hence journal-couplers 1 upward. A set of thrust-stop fasteners 4 bridge the two flange portions 1B at strategic locations using the curved thru-slots 1C (FIG. 2) and holes 1D (FIG. 2) to transfer wind-induced torque from the torque tube to the support posts, rather than all torque having to be held by the drive system. The fasteners 4 are on the underside of the bottom bearing race portion 2A, and thus significantly help in preventing the journal-coupler 1 from being lifted out of the bottom bearing race portion 2, even when the top cap 3 is not attached. The flange portions 1B use the holes 1D and curved thru-slots 1C for bridging the fasteners 4 to either temporarily hold the torque tube at no tilt with the fasteners 4 inserted in the two sets of holes 1D on either side of the bottom bearing race post portion 2B, or the fasteners 4 are placed in the curved thru-slots 1C to dump or transfer torque to the post portions 2B when the torque tube and solar panels are tilted fully east or fully west. The fasteners 4 naturally fall to the lower end of the curved thru-slots 1C, such that when the journal-coupler 1 is lifted upwards via the torque tube and solar panels in the wind, the bridging fasteners 4 pinch the bottom bearing race portion 2A, creating more frictional hold and hence more damping, further combating the wind.

In one or more embodiments, the round (circular, cylindrical, etc.) surface of the tube portion 1A contacts with or rubs against the surface of the bottom bearing race portion 2A with enough friction to dampen most wind effects. The weight of the solar panels, torque tube and journal-couplers 1 create a continuous pressure on the surface connection between the journal-coupler 1 and the bottom bearing race portion 2A to continuously establish an electrical ground path. In some embodiments, the tube portion 1A may only be round, circular, or cylindrical in the area in between the two flange portions 1B in order to be a frictional or rubbing (e.g., round/round) for a simple bearing. The remaining portions (the two sides outside of each flange portion 1B) of the tube portion 1A may be round, multi-faceted, etc. in order to accept torque tubes that are congruent (e.g., round, multi-faceted (e.g., square shaped, hexagon shaped, octagon shaped, etc.). In other embodiments, the tube may be faceted and have a round, circular, or cylindrical journal section added (or formed in a forge) in between the two flange portions 1B.

Figure 2:
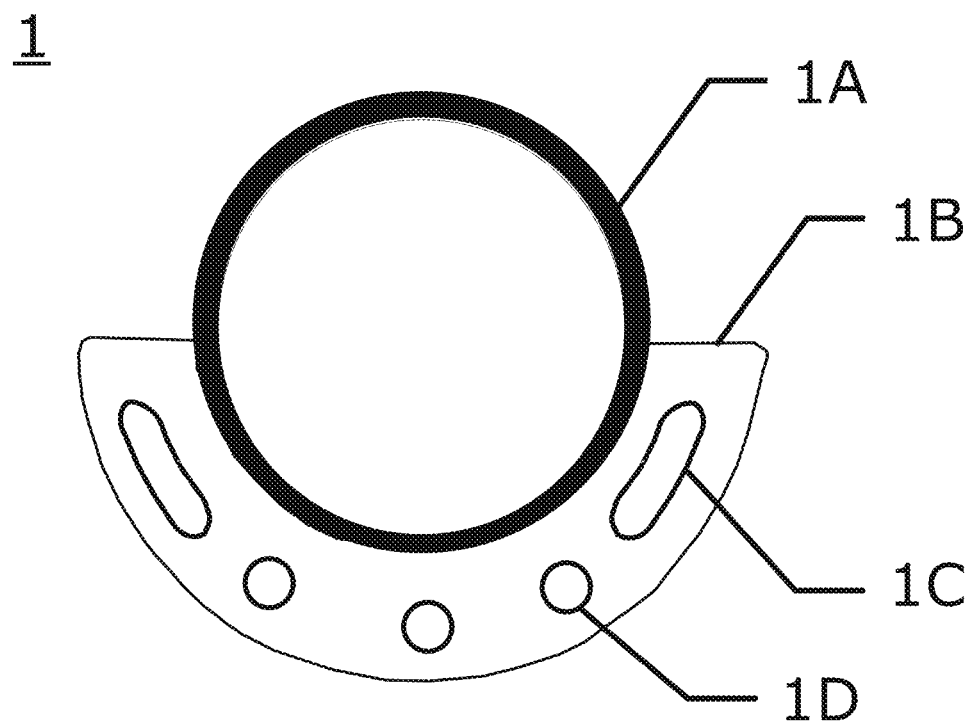
FIG. 2 shows an end view of a journal-coupler including a round tube, according to one or more embodiments.

FIG. 2 shows an end view of a journal-coupler 1 including the tube portion 1A and two attached flange portions 1B that perform as thrust-stops, according to one or more embodiments. The two attached flange portions 1B each have two curved thru-slots 1C and two or more holes 1D lined up so as to accept a fastener 4. The curved thru-slots 1C are used along with fasteners 4 to become a tilt-stop, to hold onto the bottom bearing race 2 from underneath the bottom race portion 2A, and to further pinch the bottom bearing race portion 2A when the journal-coupler 1 is lifted upward by the force of the wind on the solar panels. In some embodiments, the curved thru-slots 1C have two functions. One hole 1D (center) of the one or more holes 1D may be used to hold the journal-coupler 1 at a zero-degree tilt when a fastener 4 is inserted through the hole 1D in the post portion 2B, either manually when a drive is not connected or under maintenance, for safety, or by means of an actuated pin acting as a fastener for emergency high-wind-stow conditions.

Figure 3:
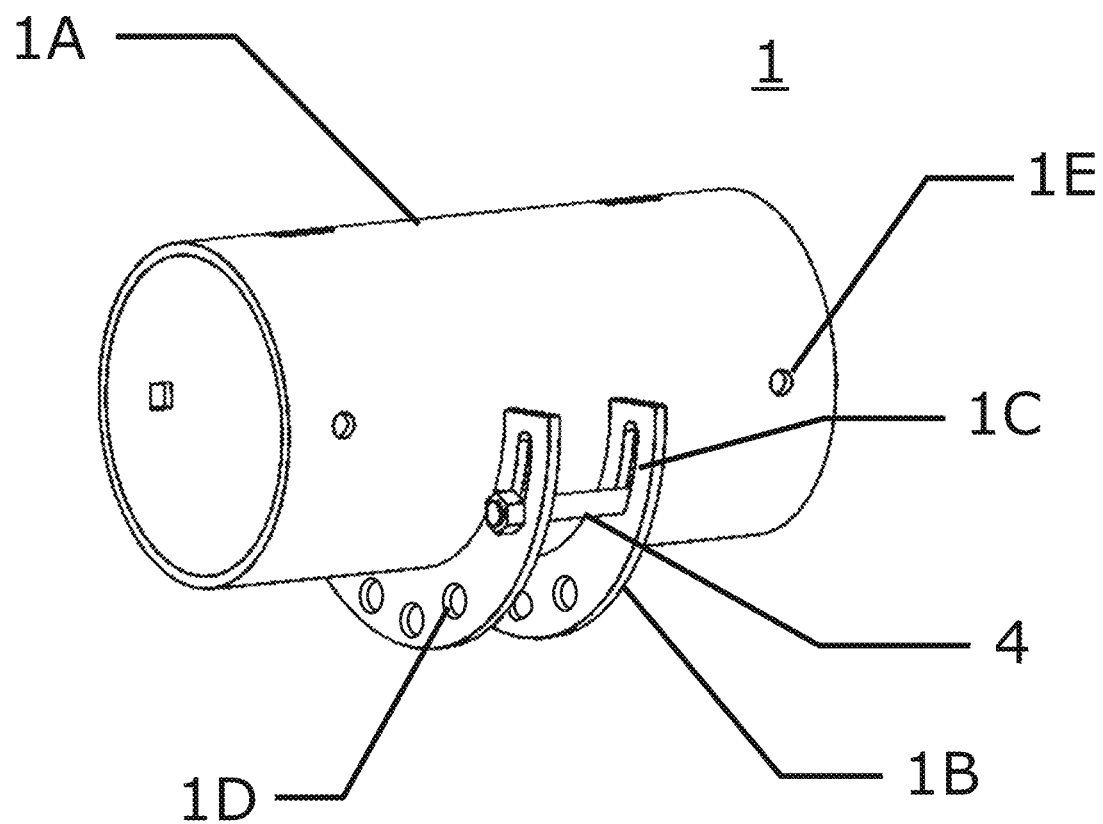
FIG. 3 shows a perspective view similar to FIG. 2 with a view of the bolt holes and/or slot holes for round torque tubes, according to one or more embodiments.

FIG. 3 shows a perspective view similar to FIG. 2 with a view of the bolt holes and/or slot holes 1E for the option of attaching, a fastener (e.g., bolts, pins, etc.) to round torque tubes such that it sleeves either over or inside of the tube portion 1A of the journal-coupler 1. Additionally shown is a fastener 4 bridging the flange portions 1B at one set of the curved thru-slots 1C.

Figure 4:
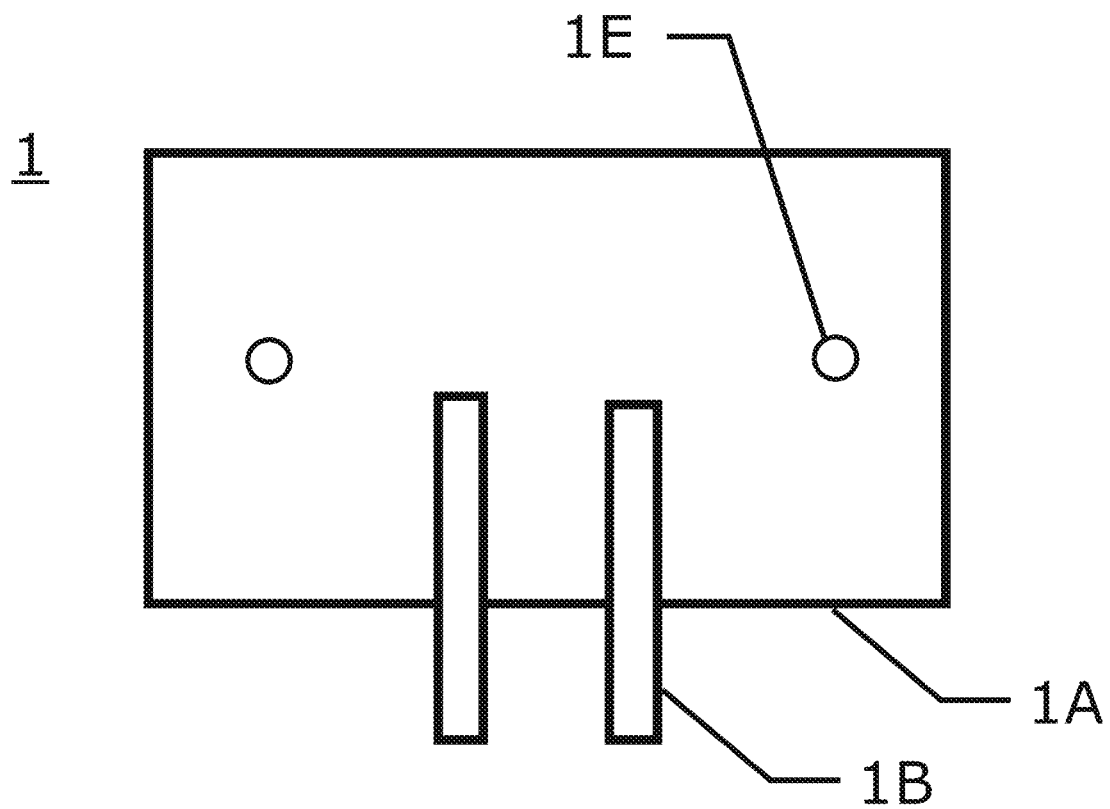
FIG. 4 shows a side view of the journal-coupler of FIG. 3 including a round tube, according to one or more embodiments.
Figure 5:
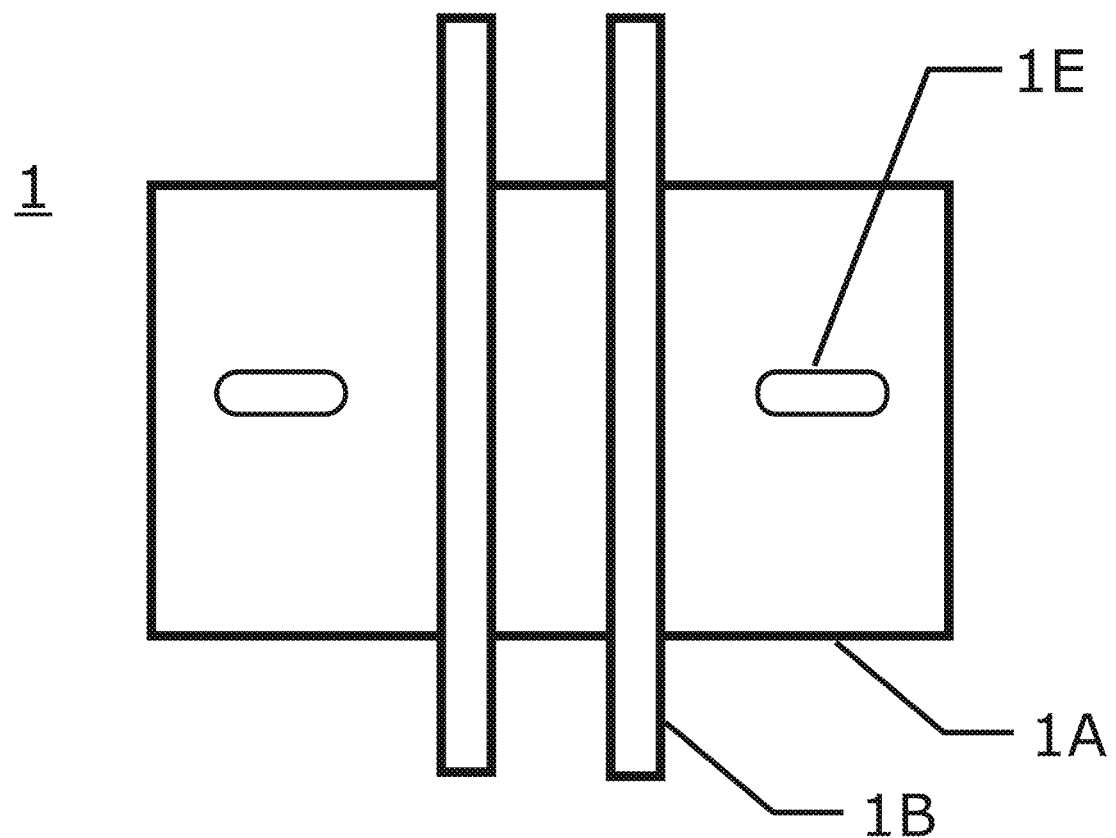
FIG. 5 shows a bottom view of the journal-coupler of FIG. 3, according to one or more embodiments.
Figure 6:
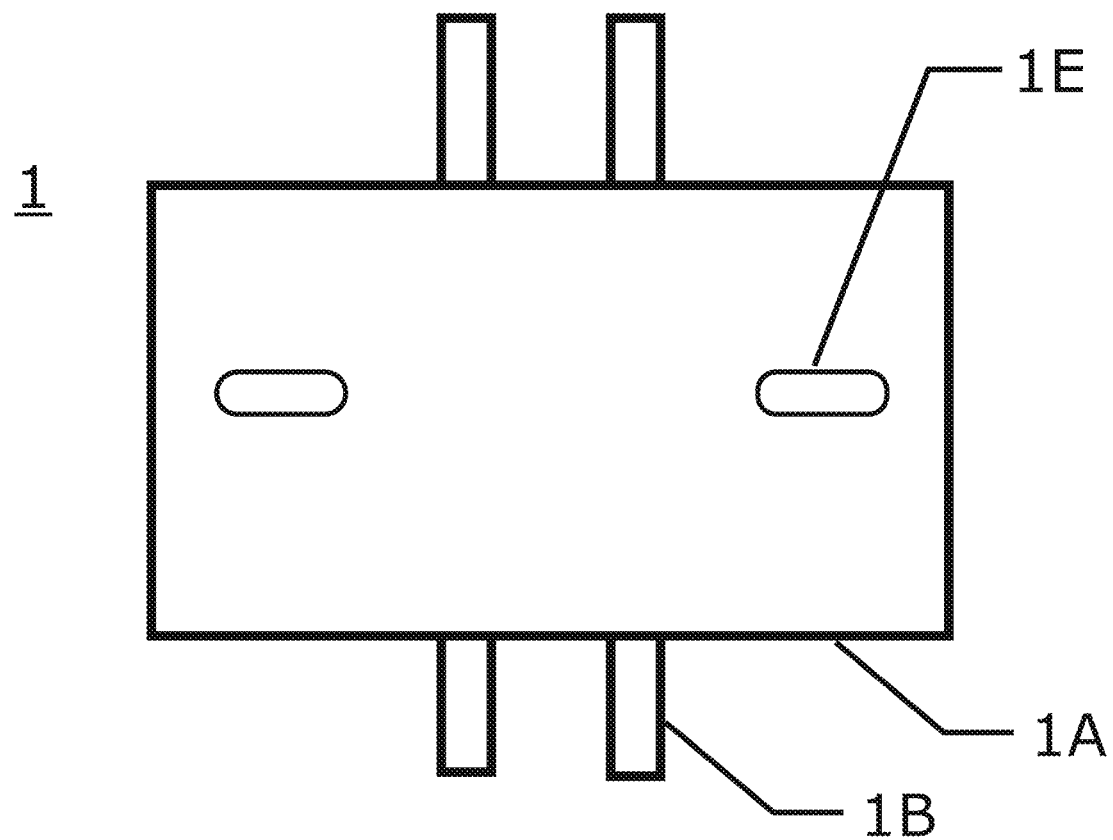
FIG. 6 shows a top view of the journal-coupler of FIG. 3, according to one or more embodiments.

FIGS. 4-6 shows a side view of the journal-coupler 1 of FIG. 3 including the tube portion 1A, according to one or more embodiments. The two flange portions 1B are well-adhered to the tube portion 1A and wrap approximately half-way around the bottom side of the tube portion 1A of the journal-coupler 1.

Figure 7:
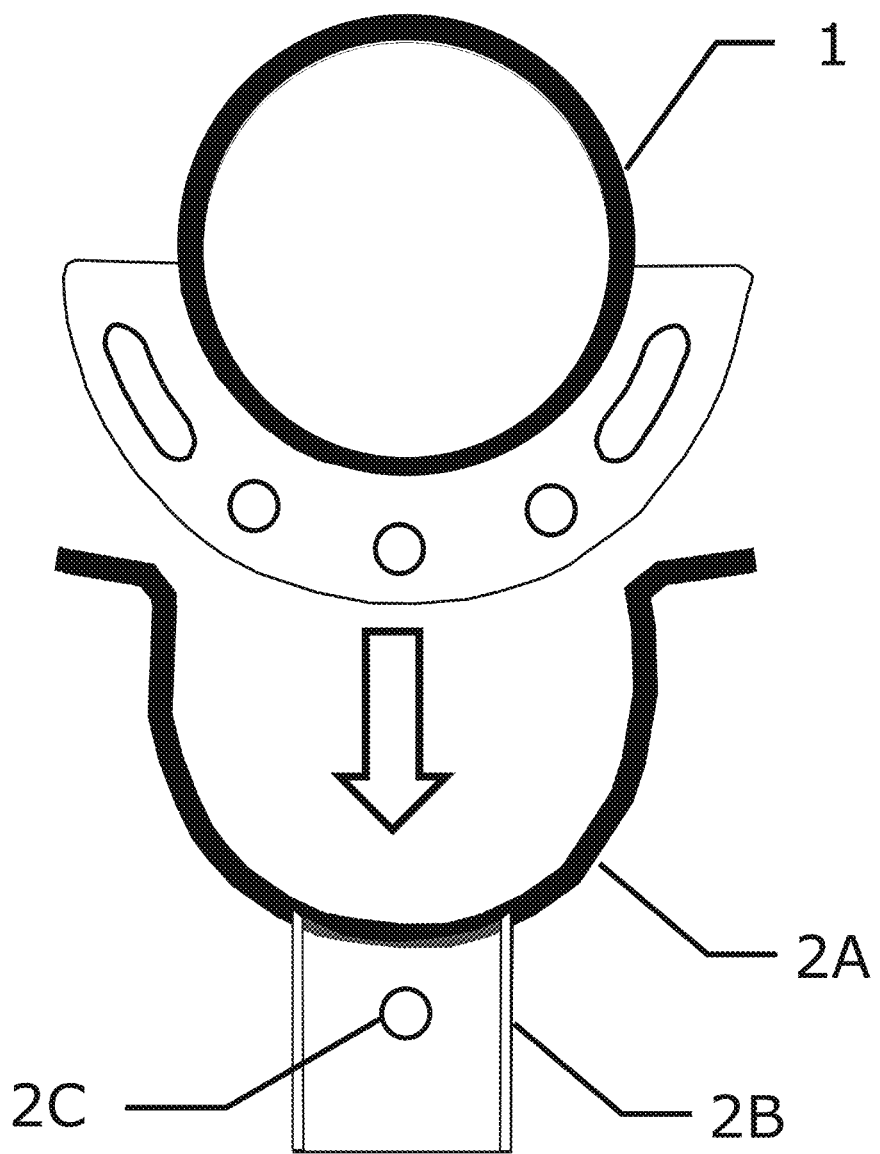
FIG. 7 shows an end view of the journal-coupler being lowered into the bottom bearing race portion of the bottom bearing race, according to one or more embodiments.

FIG. 7 shows an end view of the journal-coupler 1 being lowered into the bottom bearing race portion 2A of the bottom bearing race 2, according to one or more embodiments. In some embodiments, the tube portion 1A must be centered east-west inside the bottom bearing race portion 2A. The central hole 2C (through-hole, opening, etc.) is shown in the bearing post 2B and may be used for placing a fastener (e.g., a bridging pin, bolt, etc.) through it and an aligned hole 1D to lock the journal-coupler 1 (see also, FIG. 17).

Figure 8:
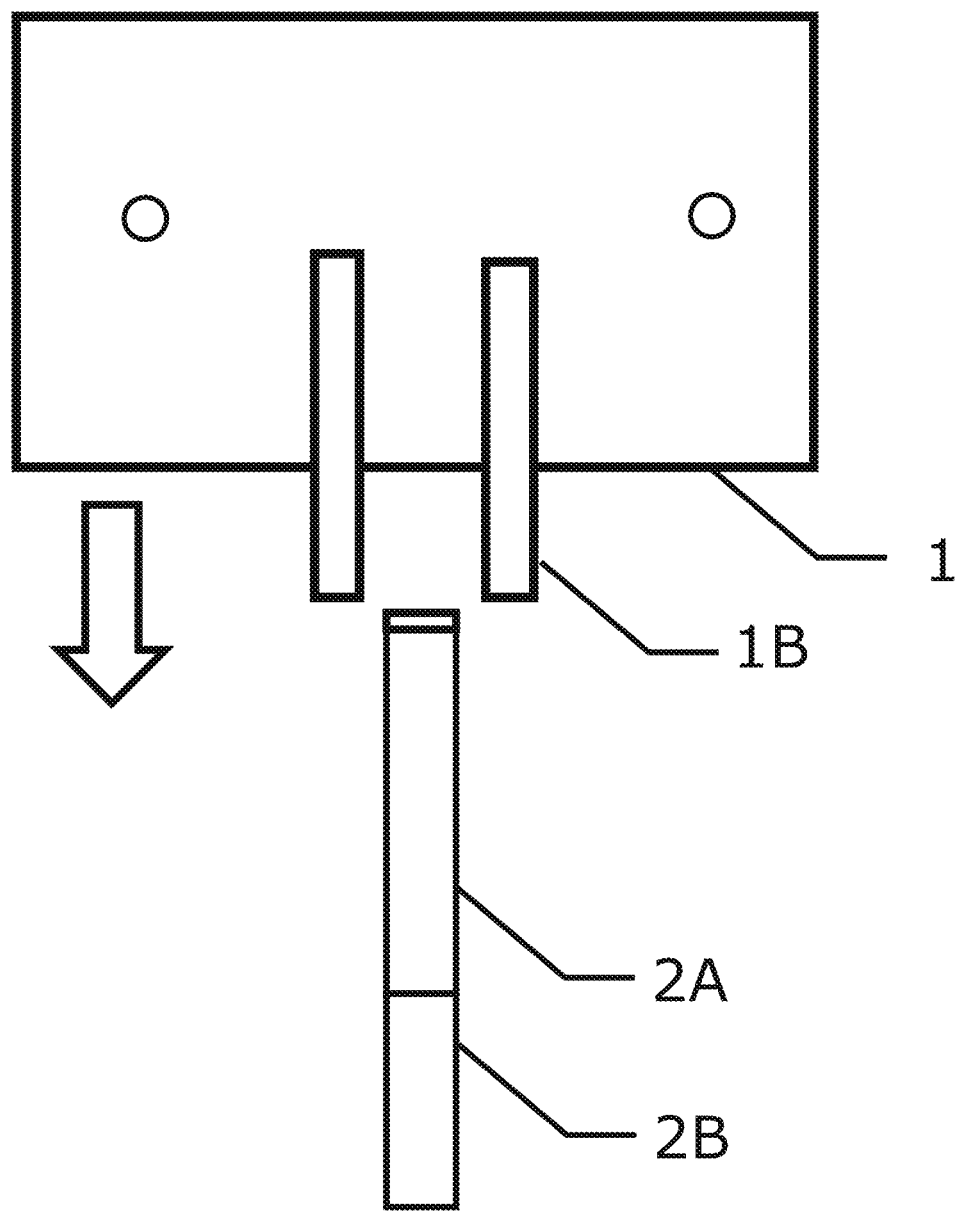
FIG. 8 shows a side view of the journal-coupler being lowered into the bottom bearing race portion of the bottom bearing race, according to one or more embodiments.

FIG. 8 shows a side view of the journal-coupler 1 being lowered into the bottom bearing race portion 2A of the bottom bearing race 2, according to one or more embodiments. In some embodiments, the two flange portions 1B must straddle the bottom bearing race portion 2A in the north-south direction (along the axis of rotation).

Figure 9:
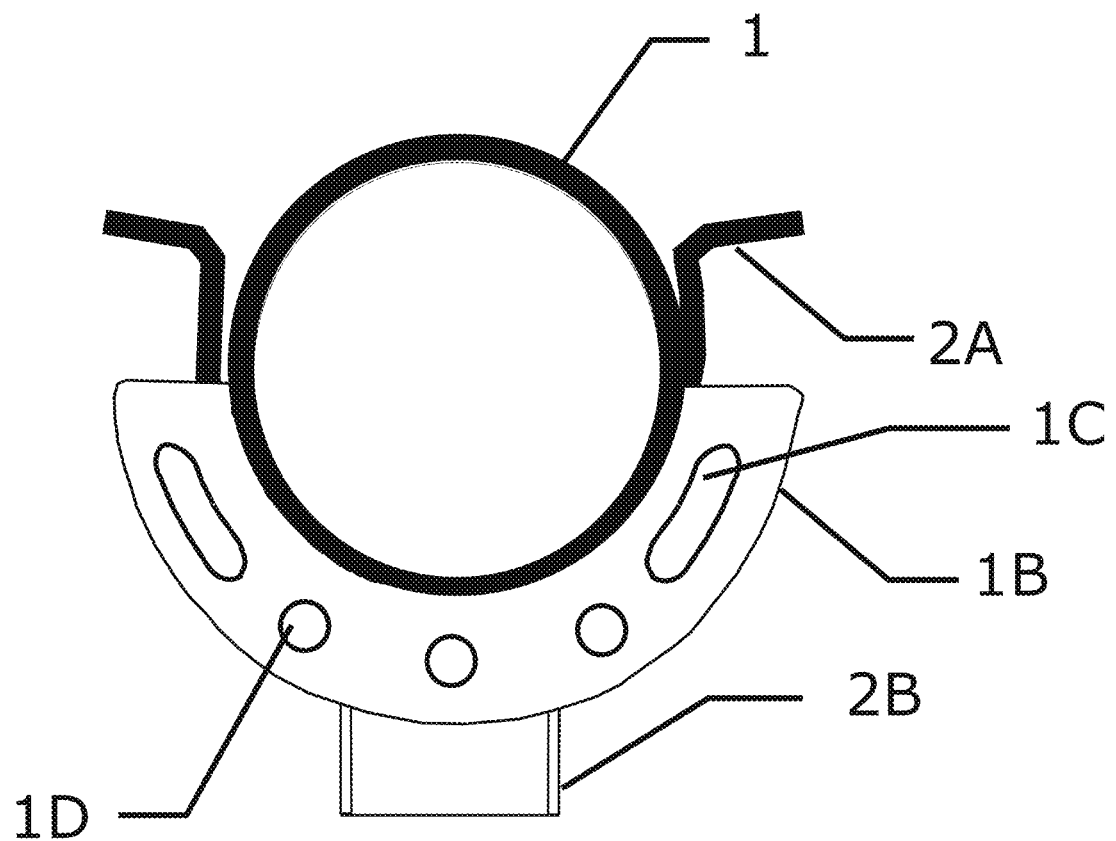
FIG. 9 shows an end view of the final result of FIG. 7 with the journal-coupler resting in the saddle of the bottom bearing race, according to one or more embodiments.

FIG. 9 shows an end view of the final result of FIG. 7 with the journal-coupler 1 resting in the saddle of the bottom bearing race portion 2A, according to one or more embodiments.

Figure 10:
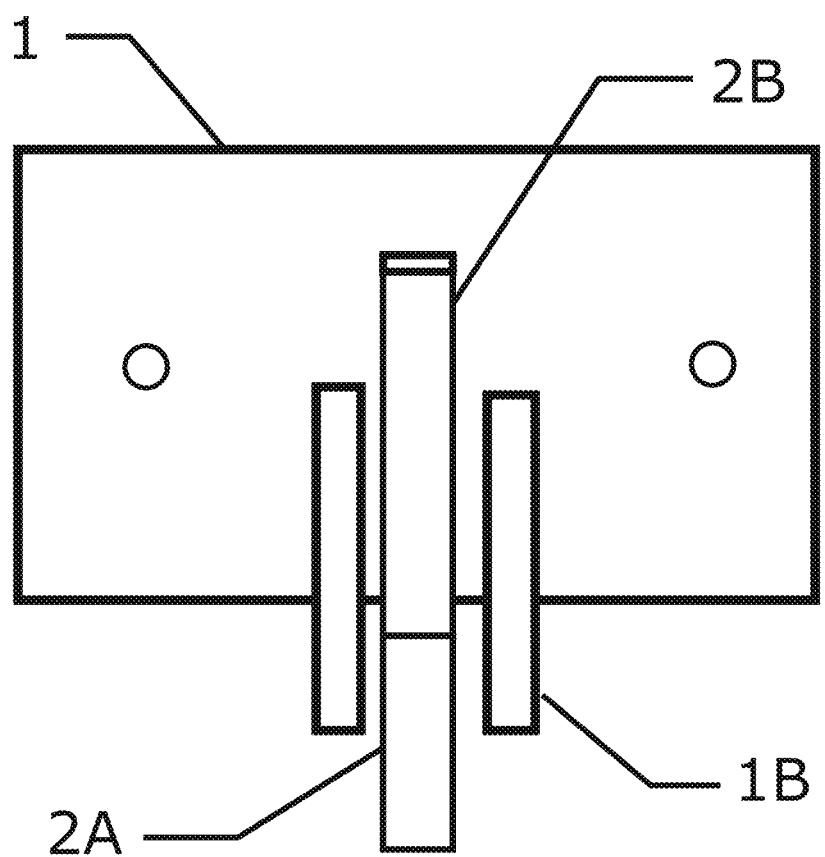
FIG. 10 shows a side view of the final result of FIG. 7, according to one or more embodiments.

FIG. 10 shows a side view of the final result of FIG. 7, and shows the bottom bearing race portion 2A sandwiched in between the two flange portions 1B of the journal-coupler 1, according to one or more embodiments.

Figure 11:
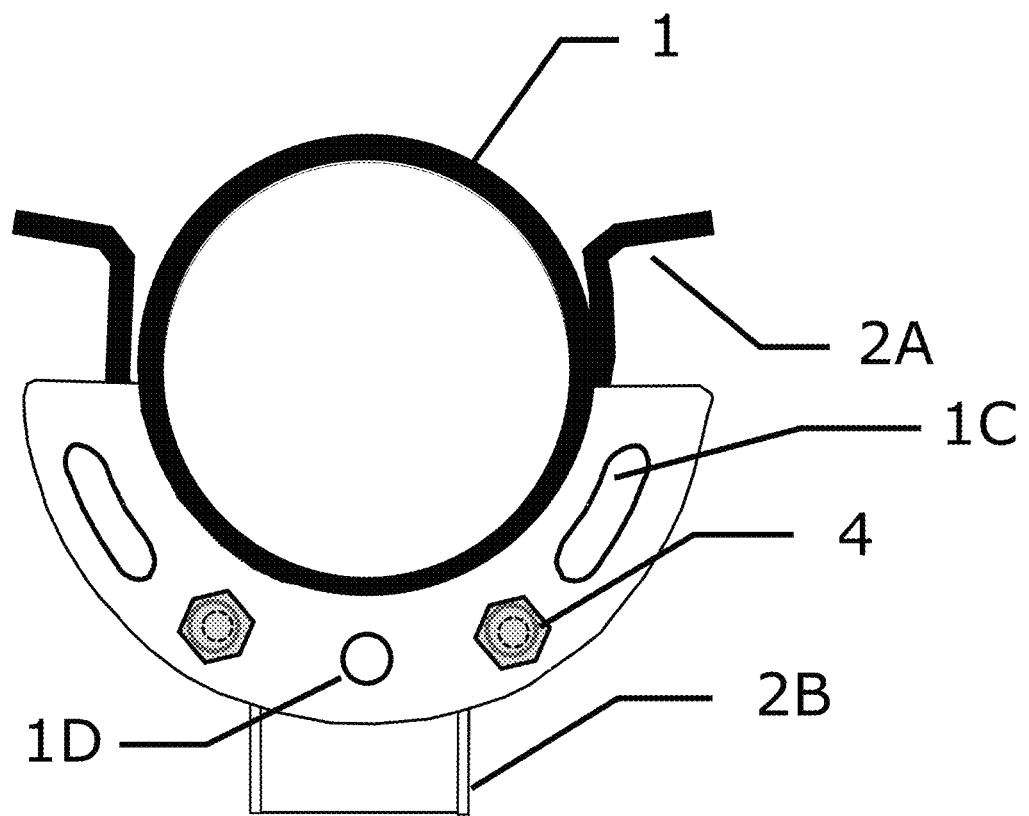
FIG. 11 shows the journal-coupler of FIG. 9 with two fasteners (acting as tilt-stops) placed through two holes in flange portions, according to one or more embodiments.

FIG. 11 shows the journal-coupler 1 of FIG. 9 with two fasteners 4 (acting as tilt-stops) placed through two holes 1D in the flange portions 1B, according to one or more embodiments. In some embodiments, this position of the two sets of holes 1D are positioned such as to place the fasteners 4 in near-immediate contact against the two sides (east and west) of the bottom post portion 2B to keep the journal-coupler 1 from turning more than a few degrees in either direction. This holds the torque tubes and any attached solar panels in one position during solar panel attachment either when the drive system is not yet connected or just as a safety measure. The fasteners 4 hold against any torque caused by wind or weight imbalance (e.g., solar panels loaded only on one side, uneven snow or ice accumulation) by transferring all and any torque to all the posts in that row. In some embodiments, actuated fasteners 4 (e.g., pins, rods, etc. may be inserted into, and removed out of, the two sets of matching holes 1D in the flange portions 1B via an actuator, via an actuated push-pull rod or other ganged moving mechanism to lock each bearing at 0° tilt for extreme wind speeds. In some aspects of the technology, a fastener 4 may be inserted manually or mechanically via a actuated movement. In one example embodiment, one long push-pull rod may have one actuator that places pins as fasteners 4 into each set of holes 1D at each simple bearing (in a row) of a system to hold at particular wind speeds (e.g., depending on area, maximum speeds for particular strength of fastener 4, etc.). This may be more efficient (and likely less expensive) than having nine (9) actuators (e.g., one (1) drive per post, and nine (9) posts/row) and have one motorized "transmission" or tilting device and eight (8) others that are connected to the motorized transmission via a daisy chain of eight (8) nine (9) meter long spinning drive shafts, or any other combinations. In one or more embodiments, there brakes are part of the system that have all wheel drive with gears, oil and seals and there are maintenance requirements over a thirty (30) year term, and the nine (9)-meter long drive shafts whip as they turn (and they turn quickly). In one example embodiment, one-push-pull rod, or a rod that turns and sets a block may be implements, but the minimal invasion into the two flange portions 1B is accomplished using the (holding) holes 1D.

Figure 12:
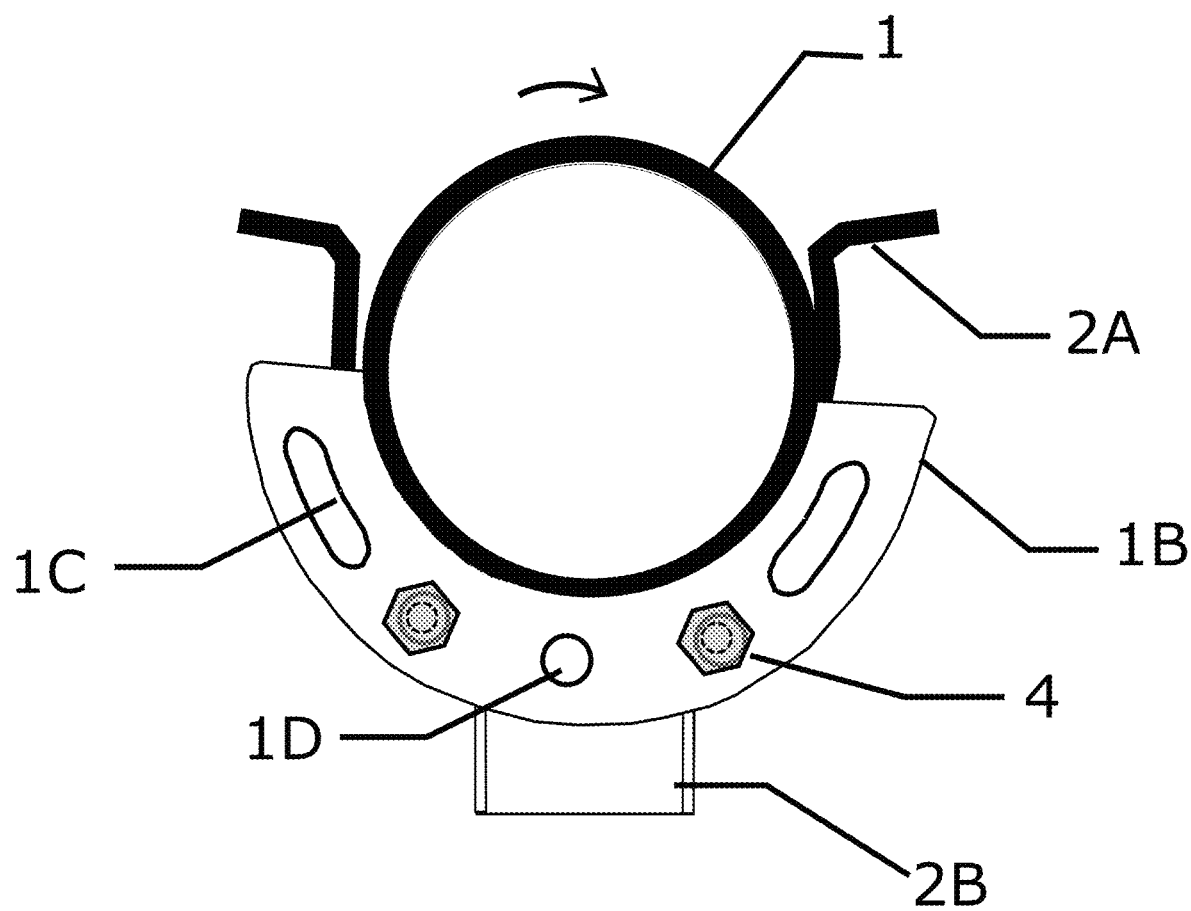
FIG. 12 shows the journal-coupler of FIG. 9 with the journal-coupler turned a few degrees clockwise such that the fastener on the right side hits against the right side of the bearing post, according to one or more embodiments.

FIG. 12 shows the journal-coupler 1 of FIG. 9 with the journal-coupler 1 turned a few degrees clockwise such that the fastener 4 on the right side hits against the right side of the bearing post 2B, according to one or more embodiments. This contact with the bearing post 2B prevents any further turning, effectively keeping the torque tube and solar panels at a horizontal position.

Figure 13:
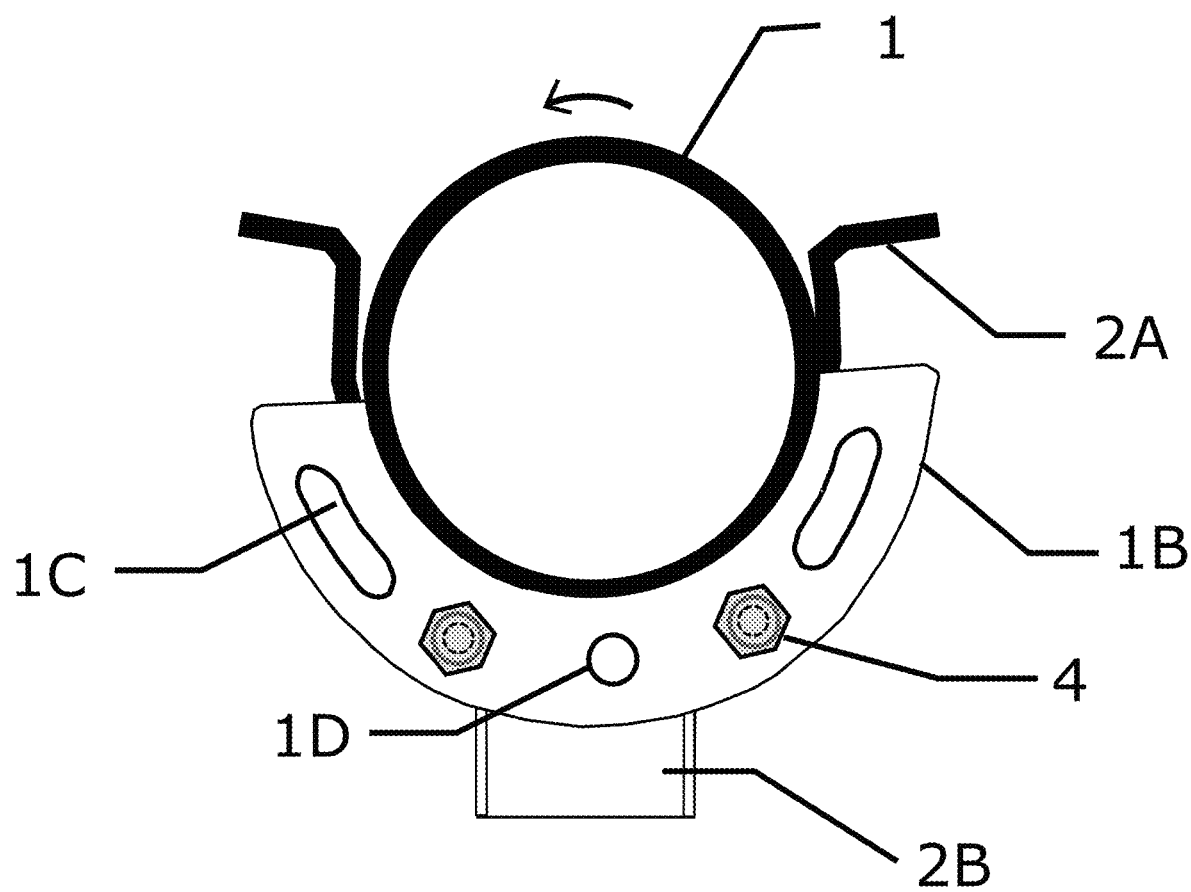
FIG. 13 shows the journal-coupler of FIG. 9 with the journal-coupler turned a few degrees counterclockwise such that the left fastener hits against the left side of the bearing post, according to one or more embodiments.

FIG. 13 shows the journal-coupler 1 of FIG. 9 with the journal-coupler 1 turned a few degrees counterclockwise such that the left fastener 4 hits against the left side of the bearing post 2B, according to one or more embodiments. This contact with the bearing post 2B prevents any further turning, effectively keeping the torque tube and solar panels at a horizontal position. The fasteners 4 are inserted manually and are temporary to keep the torque tube and solar panels from tilting during maintenance, or during set up when the drive is not yet operational. In some embodiments, an actuator inserts extractable fasteners, or extractable holding pins for high wind events to transfer any torque in the torque tube to the tracker mounting posts, rather than all the torque (e.g., wind from the backside of the solar panels when tilted) accumulating to a central drive. The actuator may then be reversed to extract the holding pins after the high-wind event has passed, allowing tracking to resume. This action may be automatically controlled using wind velocity sensors, torque sensors, etc. and programmable circuitry using processors and memory for particular set thresholds.

Figure 14:
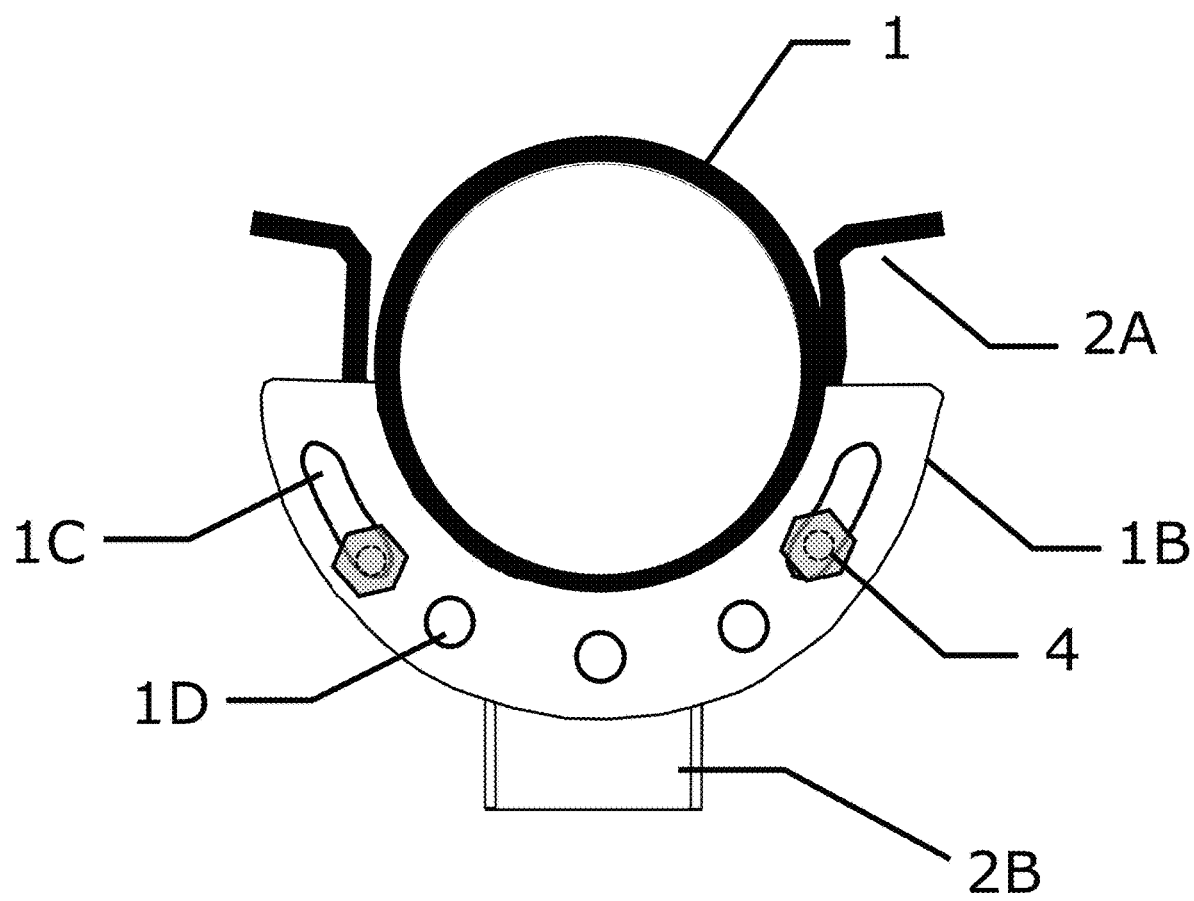
FIG. 14 shows the journal-coupler of FIG. 9 with the two fasteners inserted through the four curved thru-slots in the flange portions, according to one or more embodiments.

FIG. 14 shows the journal-coupler 1 of FIG. 9 with the two fasteners 4 inserted through the four curved thru-slots 1C in the two flange portions 1B, according to one or more embodiments. In some embodiments, the two fasteners 4 naturally settle by gravity to the lower portion of the curved thru-slots 1C, and from that position on the underside of the bottom bearing race portion 2A, and together the two fasteners 4 prevent the journal-coupler 1 from exiting the saddle of the bottom bearing race 2, or in effect retain the journal-coupler 1 inside the bottom bearing race 2 and bottom bearing race portion 2A even without a top cap 3 (FIG. 1). Furthermore, the two fasteners 4 pinch the bottom bearing race portion 2A tighter as the journal-coupler 1 is lifted (e.g., wind lifting the solar panels that lift the torque tube that lift the journal-couplers 1). This pinching function increases the friction-holding, which further dampens the simple bearing.

Figure 15:
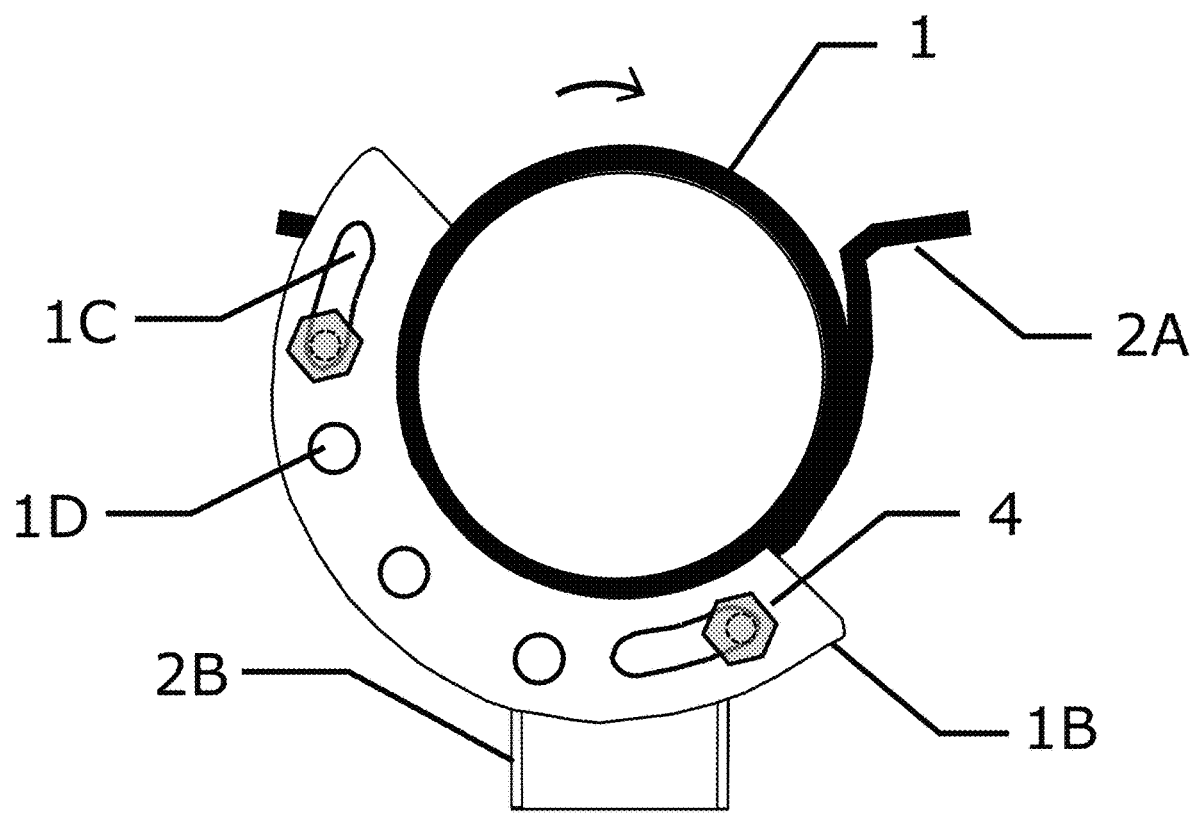
FIG. 15 shows the journal-coupler of FIG. 9 with the journal-coupler turned clockwise to the point that the right fastener is pinched between the top end of the right curved thru-slot and the right side of the bearing post, according to one or more embodiments.

FIG. 15 shows the journal-coupler 1 of FIG. 9 with the journal-coupler 1 turned clockwise to the point that the right fastener 4 is pinched between the top end of the right curved thru-slot 1C and the right side of the bearing post 2B, according to one or more embodiments. In some embodiments, the fastener 4 prevents any further tilting in that direction, and to transfer clockwise any torque in the torque tube to the tracker mounting posts, rather than all the torque (e.g., wind from the backside of the solar panels when tilted this far) accumulating to the central drive.

Figure 16:
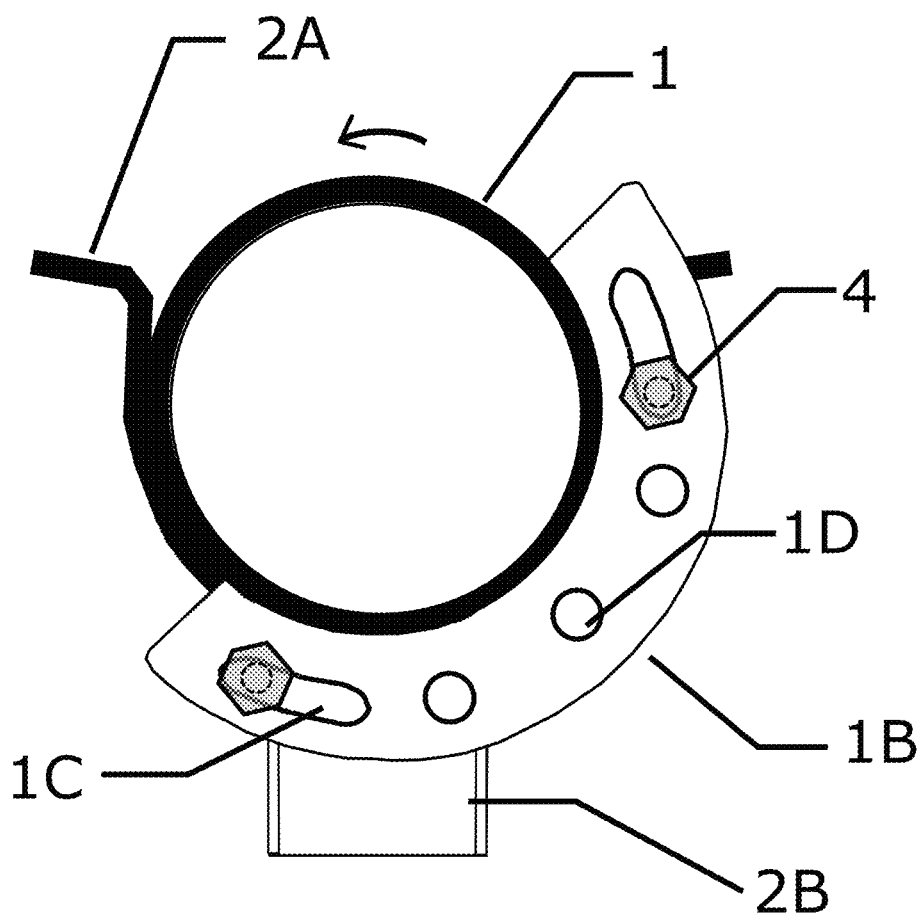
FIG. 16 shows the journal-coupler of FIG. 9 with the journal-coupler turned counterclockwise to the point that the left fastener is pinched similarly on the left side, according to one or more embodiments.

FIG. 16 shows the journal-coupler 1 of FIG. 9 with the journal-coupler 1 turned counterclockwise to the point that the left fastener 4 is pinched similarly on the left side, according to one or more embodiments. The pinching absorbs torque in the counter clockwise direction when the solar panels are fully tilted counter clockwise.

Figure 17:
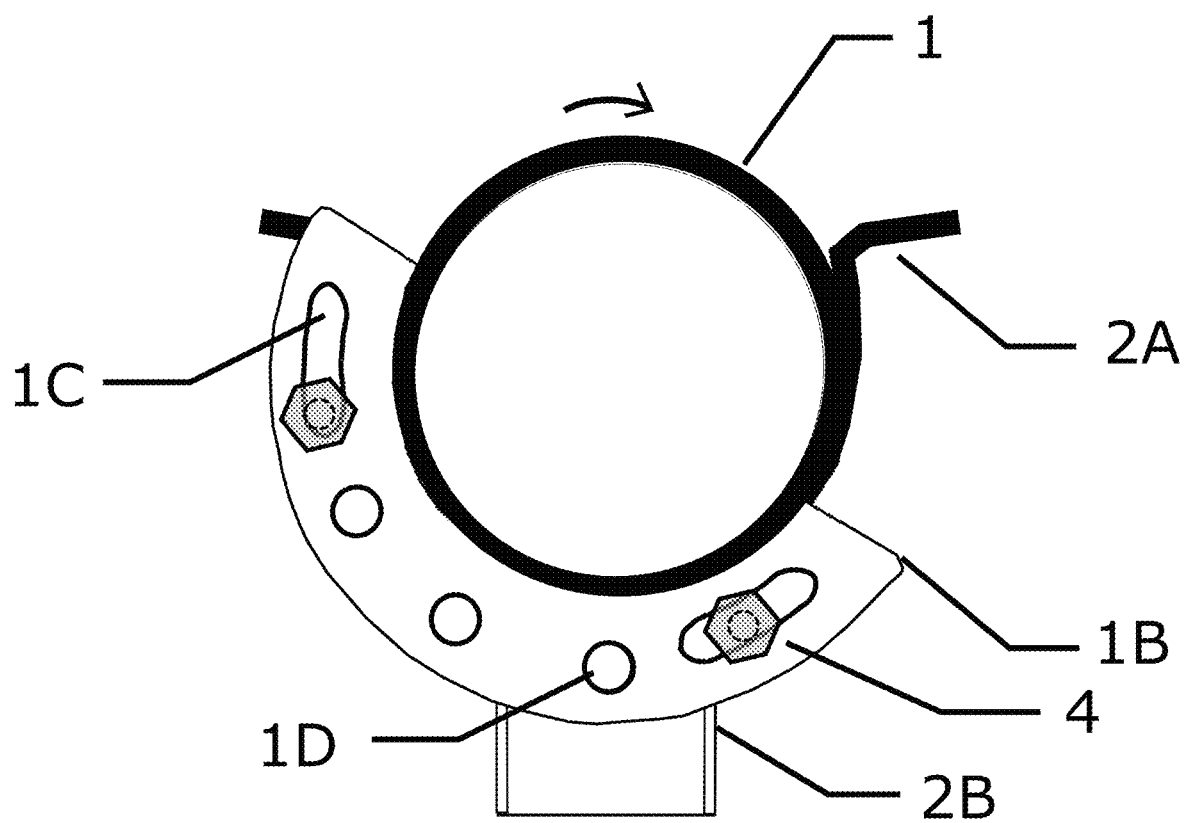
FIG. 17 shows the journal-coupler of FIG. 9 with the right hole of the flange portion aligned with the central hole in the neck or post of the bottom bearing, according to one or more embodiments.

FIG. 17 shows the journal-coupler 1 of FIG. 9 with the right hole 1D of the flange portions 1B aligned with the central hole 2C in the bearing post 2B of the bottom bearing race 2, according to one or more embodiments. Once the hole 1D is aligned with the central hole 2C, the opportunity exists to insert a fastener (e.g., an actuated bridging pin, bolt, etc.) to lock the journal-coupler 1, and hence lock the solar panels at a low tilt angle that is ideal for wind stow. In some embodiments, the actuated pin (rod, or other similar fastener) such as an actuated push-pull rod, underneath the torque tube, having a locking pin positioned at each bearing acts to be cleanly inserted and cleanly extracted by a push-pull linear actuator per row. In one example embodiment, two motorized actuators are provided per row: In some embodiments, a slew drive may be provided for a cable/pulley and a linear actuator for the push-pull rod. In one or more embodiments, sixty (60), eighty (80), etc. meters is provided for a simple push-pull rod that spans six (6), seven (7), eight (8), nine (9) etc., meter gaps from post-to-post and may only be used a few times a year, or perhaps a few times or less in a tracker's thirty-year life (e.g., a hundred (100) year wind event hitting the upper design limit). In some embodiments, sixty to eighty (60-80) meters of a spinning driveshaft may be provided per row, often spanning nine (9) meters from post-to-post, and held up in the middle with a belt, strap or similar element. In one example embodiment, a turning drive shaft that rubs in a looped suspension strap may be implemented.

Figure 18:
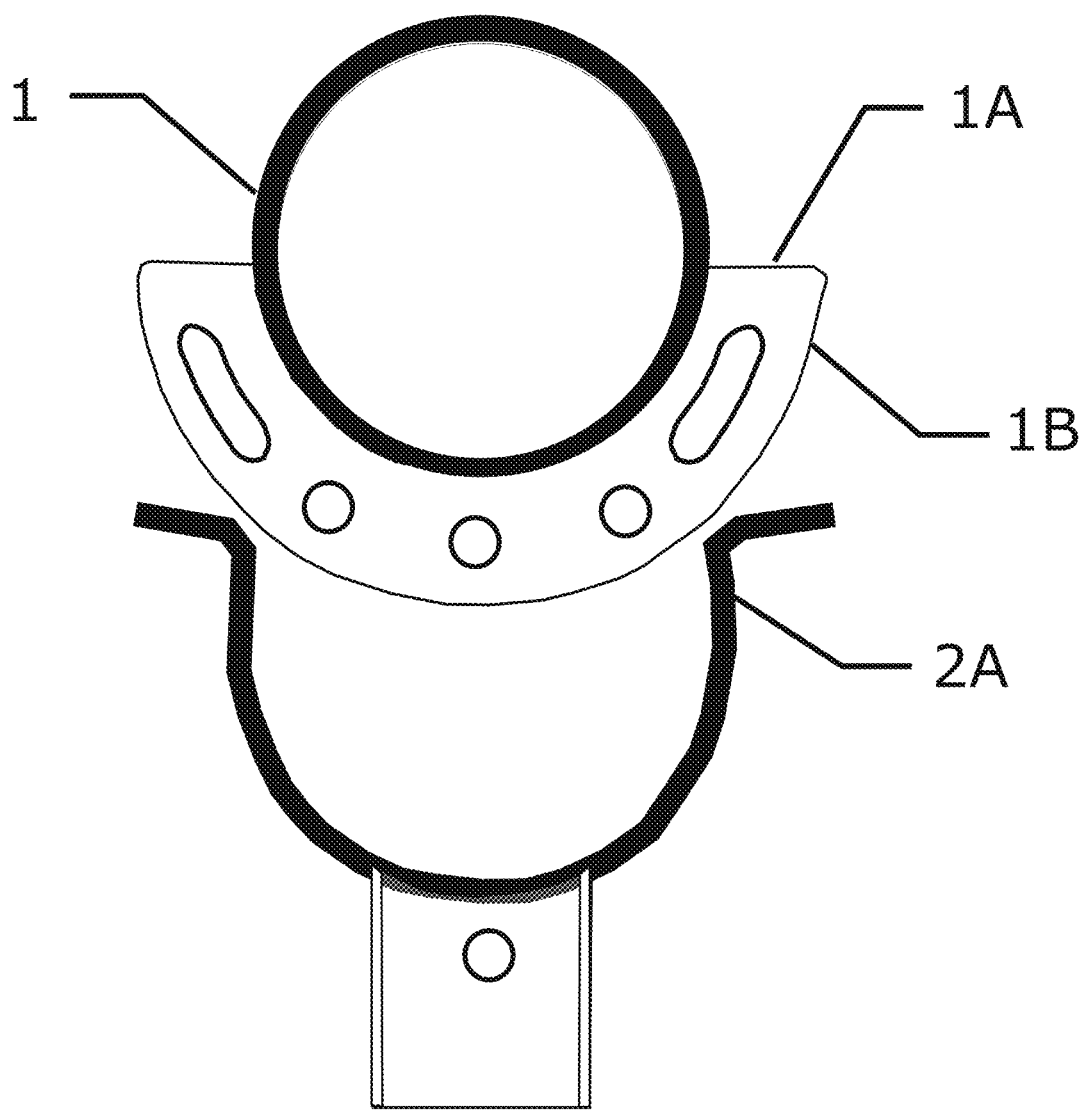
FIG. 18 shows an end view of the journal-coupler with its flange portion pointing downward and clearing the highest point on the bottom bearing race portion, according to one or more embodiments.

FIG. 18 shows an end view of the journal-coupler 1 with its flange portions 1B pointing downward and clearing the highest point on the bottom bearing race 2A, according to one or more embodiments. This shows how high the journal-coupler 1, and hence that end of the connected torque tube section, must be lifted in some cases of field assembly.

Figure 19:
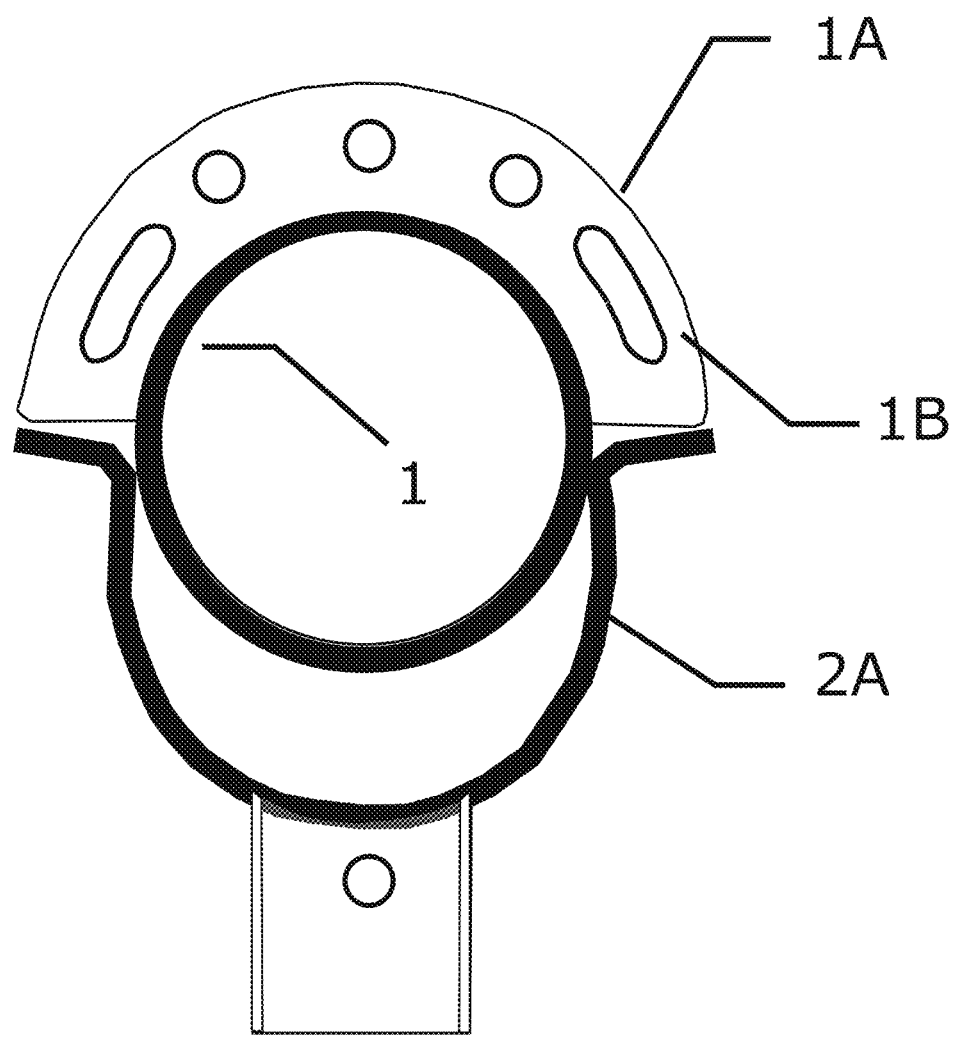
FIG. 19 shows another end view of the journal-coupler up-side down so that the flange portions are pointing upward, according to one or more embodiments.

FIG. 19 shows another end view of the journal-coupler 1 upside down (e.g., spun 180° while sleeved over the round torque tube) so that the flange portions 1B are pointing upward, according to one or more embodiments. As shown, one aspect of the technology allows the round tube to be lower than shown in FIG. 18 for clearing the highest point on the bottom bearing race 2A. In this position of the flange portions 1B, the normally top side of the flange portions 1B must clear the highest point on the bottom bearing race 2A. That is, the normally positioned top side of the flange portions 1B, which are approximately at the center point of the tube portion 1A, must clear the highest point on the bottom bearing race 2A.

Figure 20:
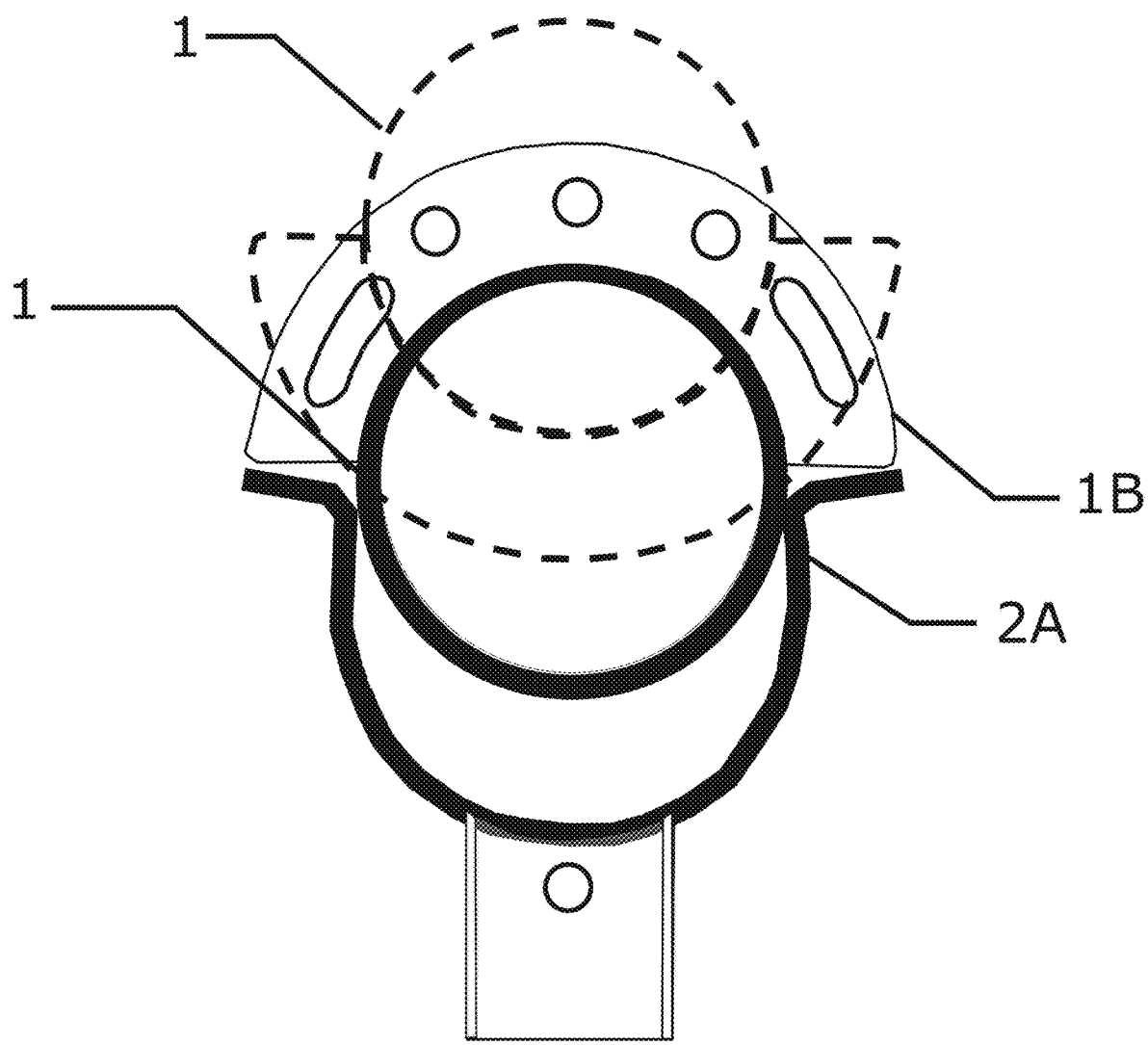
FIG. 20 shows yet another end view of the journal-coupler upside-down in juxtaposition with a dotted outline of the otherwise upside-up journal-coupler as shown in FIG. 18, according to one or more embodiments.

FIG. 20 shows yet another end view of the journal-coupler 1 in juxtaposition with a dotted outline of the otherwise upside-up journal-coupler 1 as shown in FIG. 18, according to one or more embodiments. This view shows a comparison of how much lower the journal-coupler 1 may be inserted sideways (not lowered in from above) if need be, and thus how much smaller of a tilt the torque tube section would need to be if necessary for the torque tube section to be tilted in order to slide the journal-coupler 1 into position over the bottom bearing race 2A.

Figure 21:
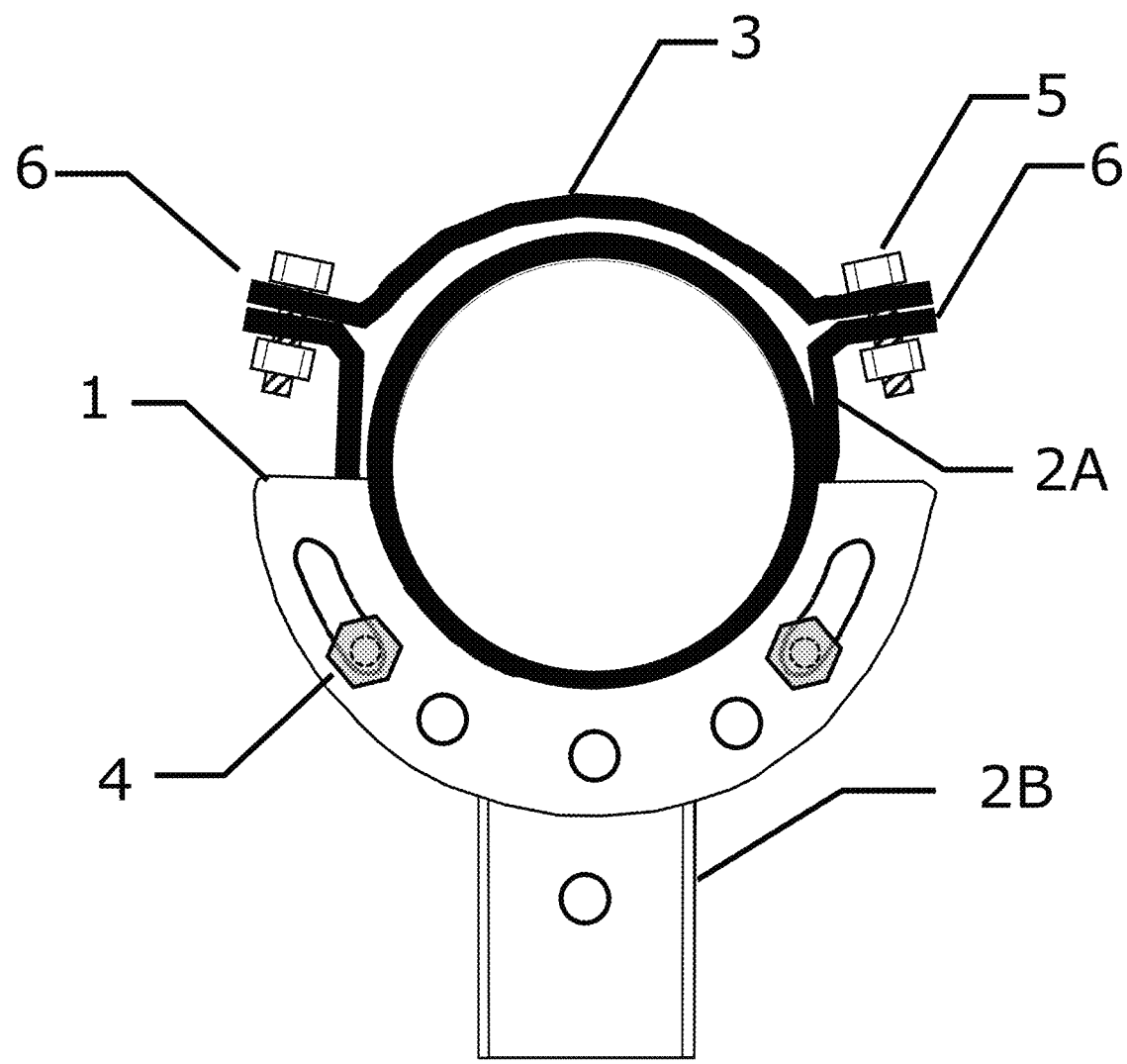
FIG. 21 shows an end view of the simple bearing of FIG. 1, according to one or more embodiments.

FIG. 21 shows an end view of the simple bearing of FIG. 1, according to one or more embodiments. As shown, the bearing cap 3 is connected to the two tabs of the bottom bearing race 2A with fastener hardware 5 (e.g., bolt and nut, etc.).

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of pre-AIA 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A bearing for single-axis solar tracking system, comprising:
    a journal including:
        a tube portion coupled to a pair of flanges that are configured as a thrust-stop, wherein each flange of the pair of flanges comprises at least one hole and at least one curved thru-slot; and
        a race removably coupled to the journal;
    wherein the at least one hole of each flange of the pair of flanges is configured for bridging by at least one fastener that holds the journal in a fixed position by removably coupling with a bottom portion of the bearing.

2. The bearing of claim 1, wherein the pair of flanges are semi-circular and straddle the race.

3. The bearing of claim 2, wherein the at least one hole of each flange of the pair of flanges is configured for bridging by at least one fastener that holds the journal in a fixed position by removably coupling with a bottom portion of the bearing.

4. The bearing of claim 3, wherein the at least one hole and the at least one curved thru-slot are further configured as tilt-stops to transfer wind torque to tracking system row posts that are coupled to a bottom portion of the race via at least one tilt-stop fastener.

5. The bearing of claim 3, wherein the at least one hole and the at least one curved thru-slot are further configured to accept bridging fasteners to pinch a bottom portion of the race upon lifting of a torque tube of the tracking system by wind force under solar panels of the tracking system to increase frictional damping.

6. The bearing of claim 1, wherein the journal and the race are each made of steel and directly contact one another for providing steel-to-steel friction for wind damping.

7. The bearing of claim 1, wherein the journal and the race are each made of steel and directly contact one another for steel-to-steel contact under pressure to maintain an electrical ground path between the journal and the race.

8. A single-axis solar tracking system, comprising:
    a journal comprising a tube portion having a pair of flanges that are configured as a thrust-stop, a first side of the tube portion is configured to receive a first torque tube, and a second side of the tube portion is configured to receive a second torque tube, wherein each flange of the pair of flanges comprises at least one hole and at least one curved thru-slot; and
    a race removably coupled to the journal;
    wherein the at least one hole of each flange of the pair of flanges is configured for bridging by at least one fastener that holds the journal in a fixed position by removably coupling with a bottom portion of the bearing.

9. The system of claim 8, wherein the pair of flanges are semi-circular and straddle the race.

10. The system of claim 9, wherein the at least one curved thru-slot of each flange of the pair of flanges is configured for bridging by at least one fastener that holds the journal in a fixed position by removably coupling with a bottom portion of the bearing.

11. The system of claim 10, wherein the at least one hole and the at least one curved thru-slot are further configured as tilt-stops to transfer wind torque to tracking system row posts that are coupled to a bottom portion of the race via at least one tilt-stop fastener.

12. The system of claim 10, wherein the at least one hole and the at least one curved thru-slot are further configured to accept bridging fasteners to pinch a bottom portion of the race upon lifting of the first and second torque tubes of the tracking system by wind force under the first and the second solar panels to increase frictional damping.

13. The system of claim 8, wherein the journal and the race are each made of steel and directly contact one another for providing steel-to-steel friction for wind damping.

14. The system of claim 8, wherein the journal and the race are each made of steel and directly contact one another for steel-to-steel contact under pressure to maintain an electrical ground path between the journal and the race.

15. A bearing for single-axis solar tracking system, comprising:
- a journal including a tube portion coupled to a pair of flanges that are configured as a thrust-stop, wherein each flange of the pair of flanges comprises at least one hole and at least one curved thru-slot; and
- a race comprising:
  - a lower portion removably coupled to the tube portion; and
  - an upper portion removably coupled to the tube portion and the lower portion.

16. The bearing of claim 15, wherein the pair of flanges are semi-circular and straddle the race.

17. The bearing of claim 16, wherein the at least one hole and the at least one curved thru-slot are configured for bridging by at least one fastener that holds the journal in a fixed position by removably coupling with the lower portion of the race.

18. The bearing of claim 17, wherein the at least one hole and the at least one curved thru-slot are further configured as tilt-stops to transfer wind torque to tracking system row posts that are coupled to the lower portion of the race via at least one tilt-stop fastener.

19. The bearing of claim 17, wherein the at least one hole and the at least one curved thru-slot are further configured to accept bridging fasteners to pinch the lower portion of the race upon lifting of a torque tube of the tracking system by wind force under solar panels of the tracking system to increase frictional damping.

20. The bearing of claim 15, wherein the journal and the race are each made of steel and directly contact one another for providing steel-to-steel friction for wind damping and to maintain an electrical ground path between the journal and the race.

\* \* \* \* \*